United States Patent Office 3,510,274
Patented May 5, 1970

3,510,274
SYNTHESIS OF NEW THORIUM COMPOUNDS
Fritz Hulliger, Zurich, Switzerland, assignor to American Cyanamid Company, Stamford, Conn., a corporation of Maine
No Drawing. Filed Apr. 9, 1968, Ser. No. 719,845
Int. Cl. C01f 15/00
U.S. Cl. 23—345                                    10 Claims

ABSTRACT OF THE DISCLOSURE

New thorium compounds of the formula ThXZ, in which X is selected from the group consisting of sulfur, selenium and tellurium, and Z phosphorus, arsenic, antimony and bismuth are prepared in microcrystalline form by sintering powders of the constituent elements at temperatures up to 650°–900° C. The products are diamagnetic or weakly paramagnetic, show metallic conductivity, and have low thermoelectric powers.

BACKGROUND OF THE INVENTION

A number of transition-metal compounds with non-metals or metalloids, such as arsenic and antimony, have been made and have been used for various purposes, including semiconductor work, thermoelectric uses, and the like. No compounds have been prepared of the formula ThXZ and X selected from the group consisting of sulfur, selenium and tellurium and Z selected from the group consisting of phosphorus, arsenic, antimony and bismuth.

SUMMARY OF THE INVENTION

According to the present invention, compounds of the formula ThXZ, in which X is selected from the group consisting of sulfur, selenium and tellurium, and Z is selected from the group consisting of phosphorus, arsenic, antimony and bismuth, are new compounds and are also produced in microcrystalline form by a sintering process. The primary subject matter of the invention is represented by the new chemical products, but in another aspect a useful process of preparing them is also included.

It should be noted that the compounds, while in microcrystalline form, are not for the most part single crystals, although it is possible, as will be described below, to so produce ThAsSe and ThAsTe. Attempts to produce single crystals by halogen vapor transport failed when uncoated quartz tubes were used, the products obtained being corresponding oxygen containing products such as ThOS, ThOSe and ThOTe. By a special procedure with a coated quartz tube it is possible to produce ThAsSe and ThAsTe as single crystals and the invention is not limited to the compounds in microcrystalline form although the new process aspect produces only such products.

Halogen vapor transport processes work well in producing corresponding uranium compounds as is described and claimed in my co-pending application Ser. No. 719,858 filed Apr. 9, 1968. The invention is not to be limited to a theory of why the a priori expected mechanism worked so badly with ternary thorium compounds although it works well with the corresponding uranium compounds. Binary compounds such as $ThS_2$ and $ThSe_2$ on the other hand can be obtained by vapor transport reactions using bromine or iodine.

It is an advantage of the present invention that the sintering technique operates smoothly, though somewhat slowly, and does not require particularly critical temperatures. Sintering temperatures from 600 to 1000° C. are quite useful, and the lack of criticality in this respect is a significant operating advantage of the present invention.

The new compounds of the present invention are homogeneous, grayish-black, microcrystalline products having a tetragonal PbFCl structure. They are diamagnetic or weakly paramagnetic and show metallic conductivity and a definite though low thermoelectric power.

It is an advantage of the present invention that the equipment to be used for sintering is not particularly critical. As long as one does not apply too high reaction temperatures quartz tubes can be used. However, it is best to coat the inside of the tube with graphite. For synthesis at high temperatures (800–1100° C.), carbon coating is imperative since otherwise ThOX results.

DESCRIPTION OF THE PREFERRED EMBODIMENTS

The invention will be described in conjunction with the following specific examples in which the parts are by weight unless otherwise specified.

Example 1

A powder mixture of substantially stoichiometric quantities of thorium, arsenic and sulfur was pressed into pills. These pills were introduced into graphite-coated quartz tubes of 40–60 mm. length, 9.5 mm. internal diameter, with a wall thickness between .5 and 2 mm., the pills fit loosely, as they are about 9 mm. in diameter and from 3 to 12 mm. long. The quartz tubes are then evacuated, sealed, and heated up to a temperature 650°–900° C. and kept at this temperature until the reaction is substantially complete. Tubes are then cooled, opened, and the product, ThAsS, removed. It is homogeneous, grayish-black powder or sintered bar, depending on the temperature. The product is microcrystalline, weakly paramagnetic or diamagnetic, and shows a metallic conductivity and a definite, although low, thermoelectric power.

Example 2

The procedure of Example 1 was repeated, replacing the arsenic with a corresponding quantity of phosphorus. A product, ThPS, was obtained which had the same appearance and similar properties to those of Example 1.

Example 3

The procedure of Example 1 was repeated, replacing the sulfur with a corersponding amount of selenium. The product ThAsSe was obtained, having similar physical properties to those of the product of Example 1.

Example 4

The procedure of Example 3 was repeated, replacing the selenium with a corresponding amount of tellurium. The product, ThAsTe, was obtained having similar physical properties to those of the product of Example 1.

Example 5

The procedure of Example 3 was repeated, replacing the arsenic with a corresponding amount of antimony. A product ThSbSe was obtained having similar physical properties to the products of the preceding examples.

Example 6

The procedure of Example 5 was repeated, replacing the selenium with tellurium, and the product ThSbTe was obtained which had similar properties to those of the products of the preceding examples.

The lattice constants of the tetragonal crystals are shown in the following table, together with the room-temperature values of the Seebeck coefficient of the single crystals.

|        | a(A.)±0.003 | c(A.)±0.005 | α300° (μV/° C.) |
|--------|-------------|-------------|-----------------|
| ThPS   | 3.979       | 8.176       |                 |
| ThAsS  | 4.012       | 8.464       |                 |
| ThPSe  | 4.074       | 8.266       |                 |
| ThAsSe* | 4.081      | 8.562       | 10(n)           |
| ThSbSe | 4.273       | 8.901       |                 |
| ThAsTe* | 4.260      | 8.812       | 20(n)           |
| ThSbTe | 4.374       | 9.137       |                 |
| ThBiTe | 4.468       | 9.174       |                 |

*Single crystals.

Example 7

A mixture of thorium powder, arsenic and selenium corresponding to 0.02 mole of ThAsSe was introduced into a carbon-coated quartz tube of 200–250 mm. length, 25–40 mm. internal diameter, and a wall thickness between 1.5 and 2 mm. The tube was evacuated and iodine gas introduced corresponding to a concentration of about 5 mg. per cm.$^3$ volume. The tube was then sealed off and placed in a two-zone furnace with the raw material at one end of the tube. In the furnace the tube was slowly heated to 600–700° C. After one day the temperature was raised and a temperature gradient applied, the end of the tube containing the raw material being kept at about 950° C. while the empty end of the tube was held at 900° C. After one week all of the material was transported in the form of reddish platelets of ThAsSe up to 6 mm. in length and 0.3 mm. thickness.

The quality of the carbon coating, i.e. the protection against oxygen may be improved in the following way. In order to cover also the blank tip of the silica tube, where it is sealed off, or breaks in the graphite coating, some cm.$^3$ of CCl$_4$ (carbon tetrachloride) can be added to the iodine gas. After sealing the ampoule, the naked tip and the quartz around eventual breaks of the carbon film are gently heated to a temperature sufficient to decompose the carbon tetrachloride and to restore the protective carbon coating. It is preferred to avoid chlorine some solid CI$_4$ is added instead of CCl$_4$, but then it is preferred to start with prereacted ThAsSe powder, since it is necessary to heat the whole ampoule to about 150° C. in order to vaporize CI$_4$ which is then decomposed at the tip. If bromine is used as carrier gas, CBr$_4$, of course, is adequate.

Example 8

The procedure of Example 7 was repeated replacing the selenium with an equivalent amount of tellurium. The temperatures were maintained slightly different namely 960° C. at the hot end of the tube and 920° at the cool end. White, square platelets of ThAsTe up to 3 mm. on an edge and from 0.5 to 1.5 mm. thickness were produced.

I claim:

1. A crystalline compound having the formula ThXZ, in which X is selected from the group consisting of sulfur, selenium and tellurium, and Z is selected from the group consisting of phosphorus, arsenic, antimony and bismuth, the products being grayish-black, microcrystalline, of the tetragonal PbCl-type structure and being diamagnetic or weakly paramagnetic but having metallic conductivity and definite thermoelectric power.

2. A crystalline compound ThPS, being microcrystalline, grayish-black, the crystal structure being of the tetragonal PbFCl type, and the product being diamagnetic or weakly paramagnetic, having metallic conductivity and definite thermoelectric power.

3. A crystalline compound ThAsS, being microcrystalline, grayish-black, the crystal structure being of the tetragonal PbFCl type, and the product being diamagnetic or weakly paramagnetic, having metallic conductivity and definite thermoelectric power.

4. A crystalline compound ThAsSe, being grayish-black in the microcrystalline form, reddish in single-crystal form, the crystal structure being of the tetragonal PbFCl type and the product being diamagnetic having a metallic conductivity and a low negative thermoelectric power.

5. A crystalline compound ThAsTe, being grayish-black in microcrystalline form, metallic white in monocrystalline form, the crystal structure being of the tetragonal PbFCl type and the product being diamagnetic having metallic conductivity and a low negative thermoelectric power.

6. A crystalline compound ThSbTe, being microcrystalline, grayish-black, the crystal structure being of the tetragonal PbFCl type and the product being diamagnetic having metallic conductivity and a low thermoelectric power.

7. A process for producing a crystalline compound having the formula ThXZ, in which X is selected from the group consisting of sulfur, selenium and tellurium, and Z is selected from the group consisting of phosphorus, arsenic, antimony and bismuth, the products being grayish-black, microcrystalline, of the tetragonal PbFCl-type structure and being diamagnetic or weakly paramagnetic but having metallic conductivity and definite thermoelectric power which comprises sintering the constituent elements at a temperature from 600° to 1100° C. under vacuum.

8. A process for producing single crystals of compounds having the formula ThXZ, in which X is selected from the group consisting of sulfur, selenium and tellurium, and Z is selected from the group consisting of phosphorus, arsenic, antimony and bismuth, the products being grayish-black, microcrystalline, of the tetragonal PbFCl-type structure and being diamagnetic or weakly paramagnetic but having metallic conductivity and definite thermoelectric power, which comprises subjecting a mixture of the elements in a carbon-coated sealed tube to halogen transport, the starting material being maintained at the hot end at a temperature between 800 and 1100° C. with the other end of the tube at a lower temperature, the tube containing a halogen gas and the temperature gradient being maintained until single crystals are transported to the cool end of the tube.

9. A process according to claim 8 in which the elements are thorium, arsenic and selenium.

10. A process according to claim 8 in which the elements are thorium, arsenic and tellurium.

References Cited

Fletcher et al., Improvements in the Manufacture of Refractory Compounds, NSA–21–45993, Dec. 31, 1967.

Jordan, High Temperature Semiconducting Compounds for Thermoelectric Power Generation, NSA–16–12090, May 31, 1962.

Obolonchik et al., Selenides and Tellurides of Rare Earth Metals and Actinides, NSA–20–38927, Nov. 15, 1966.

BENJAMIN R. PADGETT, Primary Examiner

M. J. McGREAL, Assistant Examiner

U.S. Cl. X.R.

136—238, 240